United States Patent [19]

Raye et al.

[11] 4,330,227
[45] May 18, 1982

[54] CUTTING TOOL WITH INTERCHANGEABLE INSERT-HOLDING CARTRIDGES

[75] Inventors: Pierre Raye, Prangins; Henri Jaquiery, Nyon; Hermann Gehri, Prangins, all of Switzerland

[73] Assignee: Stellram S.A., Nyon, Switzerland

[21] Appl. No.: 179,443

[22] Filed: Jun. 19, 1980

[30] Foreign Application Priority Data

Aug. 31, 1979 [CH] Switzerland .................... 7896/79

[51] Int. Cl.³ ............................................. B26D 1/12
[52] U.S. Cl. ........................................ 407/36; 407/44; 407/46
[58] Field of Search ............... 407/46, 48, 41, 42, 407/44, 33, 34, 36

[56] References Cited

U.S. PATENT DOCUMENTS 3,104,453 9/1963 Greenleaf ............................ 407/46
3,888,145 6/1975 Heaton et al. ..................... 407/44

FOREIGN PATENT DOCUMENTS 1206273 7/1960 Fed. Rep. of Germany .
2066176 10/1970 France .
52-28780 3/1977 Japan .................................. 407/46

OTHER PUBLICATIONS

"Werkstatt und Betrieb", vol. 110, No. 5, May 1977, Carl Hanser Verlag, Munich (DE).
"Machine Moderne", No. 817, Jul. 1977, Machine Moderne, Paris (FR).

Primary Examiner—Leonidas Vlachos
Attorney, Agent, or Firm—Young & Thompson

[57] ABSTRACT

The cutting tool, for example a milling-cutter, with interchangeable insert-holding cartridges comprises a body (1) presenting a peripheral supporting face (4) directed towards the rear end of the body and recesses (2) distributed at its peripheral front end and intended to receive interchangeable cartridges (3). Each cartridge comprises at its front end a cutting bit (5), generally fixed in a removable manner, and a back portion (7) at its rear end presenting a supporting face (8) directed towards the front and intended to come, in a service position, in abutment against the supporting face (4) of the body. The fixing devices (9, 11) of the cartridges on the body of the tool are such that they enable an axial setting of the position of said cartridges, as well as the backward movement thereof for a temporary putting out of service.

9 Claims, 4 Drawing Figures

CUTTING TOOL WITH INTERCHANGEABLE INSERT-HOLDING CARTRIDGES

The present invention relates to a cutting tool, for example a milling-cutter, with interchangeable insert-holding cartridges, comprising a body of cylindrical general shape presenting recesses distributed at its front peripheral end and intended to receive in a removable manner cartridges each comprising at its front end a cutting bit.

Cutting tools of the above mentioned type are already known, in which the cartridges are axially positioned through a fixed abutment, this enabling the quick change of the cartridges without obligation to proceed with setting the position thereof. In these tools however, the supporting faces are disposed in such a manner that the axial stresses exerted on the cutting bit and thereby on the cartridge tend to push the supporting face of the cartridge against that of the body of the tool. But, in the case of stronger axial stresses, for example in the case of accidental breaking of a cutting bit or in case of insufficient blocking of the cartridge, the supporting surface of the body can be damaged. Furthermore, the concept of this abutment hinders the temporary putting out of service of one or several cutting bits, since the cartridges cannot be pushed back.

The cutting tool according to the present invention intends to obviate the above mentioned drawbacks, and is characterized by the fact that the body of the tool comprises a peripheral supporting surface, which is directed towards the rear end of said body and by the fact that each cartridge is provided at its rear end with a back portion presenting a supporting face directed towards the fore end of the cartridge and intended to come, in a service position, in abutment against said supporting surface of the body.

The supporting face of the back portion of the cartridge and the supporting surface of the body of the tool are generally perpendicular to the longitudinal axis of said tool.

The accompanying drawings show schematically by way of example two embodiments of the cutting tool according to the present invention.

Figure 1:
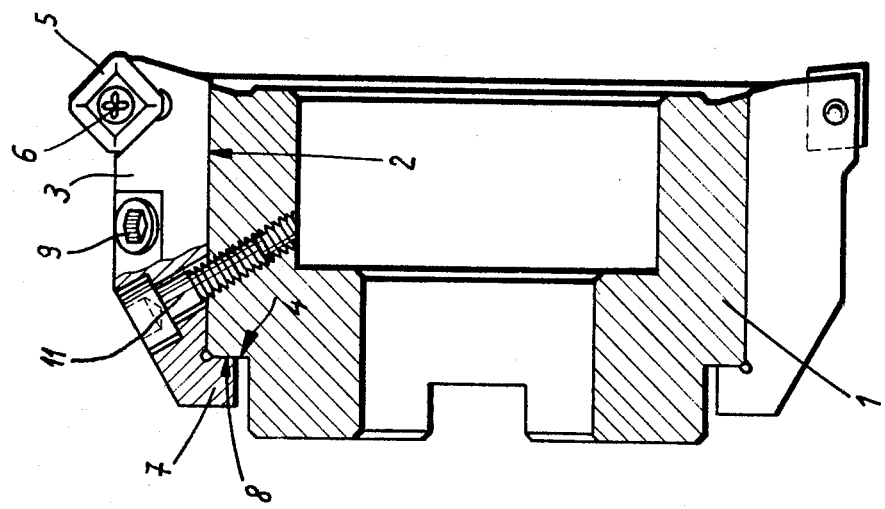
FIGS. 1 and 2 are cross-section and face views, respectively, of a first embodiment.
Figure 2:
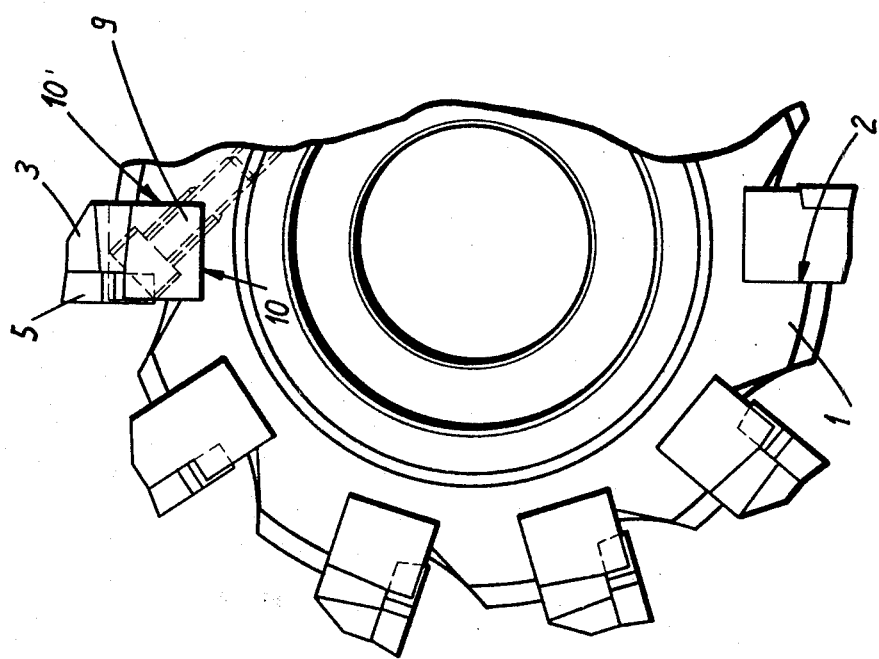

Referring first to FIGS. 1 and 2, the first embodiment of the cutting tool according to the invention, more particularly a milling-cutter, comprises a body 1, of a cylindrical general shape, presenting at its front peripheral end recesses 2 intended to receive insert-holding cartridges 3. This body 1 further presents a peripheral supporting surface 4, which is directed towards the rear end of the body.

Each cartridge 3 comprises at its front end a recess intended to receive a cutting bit 5, which is here fixed in a conventional and removable manner by means of a screw 6. The same milling-cutter body may receive cartridges 3 of various geometries, that is holding cutting bits 5 disposed according to various orientations, depending on the work operation be carried out (surfacing, dressing, roughing, finishing, etc.).

Each insert-holding cartridge 3 is further provided at its rear end with a back portion 7 presenting a supporting face 8 directed towards the front of the cartridge. This supporting face 8 is intended to come, in the service position shown on FIG. 1, in abutment against the supporting surface 4 of the milling-cutter body 1.

In this first embodiment, the insert-holding cartridges 3 are fixed on the milling-cutter body 1 by means of a locking screw 9, the axis of which is situated in a plane parallel to the plane of the supporting surface 4 and supporting face 8, and serving to lock the cartridges 3 against the walls 10, 10' of their recess 2, and of a screw 11, the axis of which is situated in a plane oblique with regards to the plane of the supporting surface 4 and supporting face 8 and being forwardly inwardly included, said screw 11 serving to bring the supporting face 8 of the back portion 7 of the cartridges 3 in abutment against the supporting surface 4 of the milling-cutter body 1.

If necessary, for example in order to carry out finishing operations or if a particularly fine state of the surface of the worked piece is necessary, it is possible to realize a very precise separate setting of the axial position of each cartridge by means of the screw 11. This axial setting is possible thanks to the relatively important slack left between the screws 9 and 11 and their respective passage openings provided within the cartridge 3 having an elongated shape. In the case of such a setting, or when it is wished, for example with a milling-cutter provided with one or two cartridges of the "finishing" type, to retreat these cartridges for a temporary putting out of service, the supporting face 8 of the back portion 7 of the cartridge 3 is no longer in abutment against the supporting surface 4 of the milling-cutter body 1.

Figure 3:
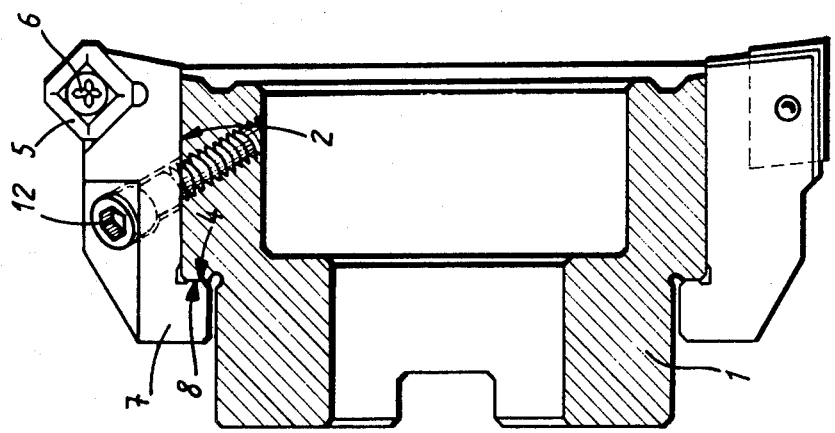
FIGS. 3 and 4 are cross-section and face views, respectively, of a second embodiment.
Figure 4:
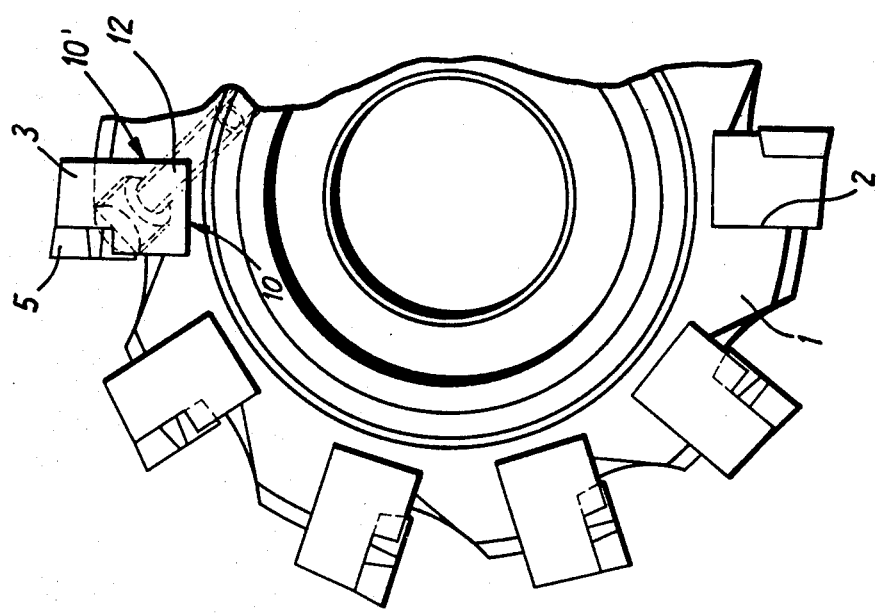

The second embodiment shown on FIGS. 3 and 4 is distinguished from the first embodiment which has been described above only by the way of fixing the insert-holding cartridges 3 in their recesses 2 provided at the peripheral front end of the milling-cutter body 1. As a matter of fact, the locking is obtained here by means of only one screw 12, the axis of which is situated in a plane oblique with regards to the plane of the supporting face 8 and supporting path 4 and directed from the back to the front, ensuring thus the support of the face 8 of the back portion 7 of the cartridge 3 against the supporting surface 4 of the body 1, and simultaneously ensuring thanks to its orientation with regards to the axis of the body 1 the blocking of the cartridge 3 against the faces 10, 10' of its recess 2, as it can be seen on FIG. 4.

With regards to the known milling-cutters with interchangeable cartridges with axial support, the cutting tool according to the invention especially presents the following advantages:

When the cartridges are subjected to axial stresses higher than the normal stresses, for example in case of an accidental breaking of a cutting bit or in case of an insufficient blocking of the cartridge, the axial pressure thanks to the new concept of the supporting faces tends to keep away the supporting face 8 of the back portion 7 of the cartridge 3 from the supporting surface 4 of the body 1, instead of pushing the supporting faces the one against the other, as is the case in the known milling-cutters, and which tends to damage these supporting faces.

The separate and precise axial setting of the cartridge position, as well as the backward movement thereof for a temporary putting out of service, is possible, whereas the concept of the known milling-cutters of the same type makes quite impossible any axial setting or backward movement.

What we claim is:

1. In a cutting tool with interchangeable insert-holding cartridges, which comprises a body of a generally cylindrical shape having recesses distributed about its front peripheral end and intended to receive in a removable manner the cartridges, each cartridge comprising at its front end a cutting bit; the improvement in which said body of the tool comprises a peripheral supporting surface which is directed toward the rear end of said body and each cartridge is provided at its rear end with a back portion having a supporting face directed toward the front of the cartridge and intended to come, in a service position, into abutment against said support surface of said body, and fixing means for each cartridge in its recess provided in said body comprising a screw cooperating with an opening traversing the cartridge and with a threading provided in the body, the axis of said opening and of said threading being situated in a plane oblique to the plane of the supporting surface and directed forwardly inwardly, in such a manner that in screwed service position, said screw keeps the supporting face of the back portion of the cartridge against the supporting surface of the body of the tool.

2. Cutting tool according to claim 1, in which the surface of the supporting path of the body is substantially perpendicular to the axis thereof.

3. Cutting tool according to claim 2, in which the supporting face of the back portion of the cartridge is substantially perpendicular to the axis thereof.

4. Cutting tool according to claim 3, in which said fixing means comprise a second screw cooperating with an opening traversing the cartridge and with a threading provided in the body, the axis of said latter opening and threading being situated in a plane substantially parallel to the plane of the supporting path respectively of the supporting face, said screw being intended to lock the cartridge within its recess.

5. Cutting tool according to claim 1, in which said opening traversing the cartridge has an elongated shape, in such a manner to provide a slack enabling the setting of the axial position of the cartridge.

6. Cutting tool according to claim 1, in which said screw is further oriented in such a manner that it ensures the locking of the cartridge within its recess.

7. Cutting tool according to claim 1, in which the cutting bits are fixed in a removable manner in recesses provided at the front end of the cartridges.

8. Cutting tool according to claim 1, said axis intersecting the axis of rotation of the tool.

9. Cutting tool according to claim 1, said axis being skewed relative to the axis of rotation of the tool.

* * * * *